United States Patent
Lindhorst

(10) Patent No.: US 10,640,022 B2
(45) Date of Patent: May 5, 2020

(54) DEVICE AND METHOD FOR FASTENING A BACKREST COVER TO A VEHICLE SEAT

(71) Applicant: VOLKSWAGEN AKTIENGESELLSCHAFT, Wolfsburg (DE)

(72) Inventor: Volker Lindhorst, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/215,232

(22) Filed: Dec. 10, 2018

(65) Prior Publication Data

US 2019/0106032 A1    Apr. 11, 2019

Related U.S. Application Data

(63) Continuation of application No. PCT/EP2017/064055, filed on Jun. 9, 2017.

(30) Foreign Application Priority Data

Jun. 9, 2016    (DE) .................. 10 2016 210 242

(51) Int. Cl.
  *B60N 2/58* (2006.01)
  *B60N 2/68* (2006.01)
  *B60N 2/60* (2006.01)

(52) U.S. Cl.
  CPC .......... *B60N 2/5825* (2013.01); *B60N 2/5858* (2013.01); *B60N 2/6009* (2013.01); *B60N 2/682* (2013.01); *B60N 2205/20* (2013.01)

(58) Field of Classification Search
  CPC .. B60N 2/5825; B60N 2/5858; B60N 2/6009; B60N 2/682; B60N 2205/20

USPC ....................................................... 297/218.3
See application file for complete search history.

(56) References Cited

U.S. PATENT DOCUMENTS

| 6,277,023 | B1 | 8/2001 | Schwarz |
| 7,222,915 | B2 | 5/2007 | Philippot et al. |
| 7,549,699 | B2 | 6/2009 | Humer et al. |
| 7,819,470 | B2 | 10/2010 | Humer et al. |
| 7,959,225 | B2 | 6/2011 | Humer et al. |
| 9,440,568 | B2 | 9/2016 | Hong |
| 2008/0284220 | A1 | 11/2008 | Kraft |

(Continued)

FOREIGN PATENT DOCUMENTS

| DE | 2930719 A1 | 1/1981 |
| DE | 19650823 C1 | 1/1998 |

(Continued)

OTHER PUBLICATIONS

Machine Translation of JP2002142914 (Year: 2019).*
International Search Report dated Sep. 13, 2017 in corresponding application PCT/EP2017/064055.

*Primary Examiner* — Mark R Wendell
(74) *Attorney, Agent, or Firm* — Muncy, Geissler, Olds & Lowe, P.C.

(57) ABSTRACT

A device and a method for attaching a backrest cover to a vehicle seat. Provision is made that at least one latching element with which the backrest cover is attached to the vehicle seat in an assembly step is mounted in a floating manner on the backrest cover. In this design, the latching element is movable along a defined guideway relative to the backrest cover.

12 Claims, 5 Drawing Sheets

(56) References Cited

U.S. PATENT DOCUMENTS

| | | | |
|---|---|---|---|
| 2012/0091177 A1* | 4/2012 | Ackeret | ................. B60R 7/043 |
| | | | 224/275 |
| 2012/0319448 A1 | 12/2012 | Mineta et al. | |
| 2014/0042792 A1 | 2/2014 | Kajiwara | |
| 2015/0251579 A1 | 9/2015 | Line et al. | |

FOREIGN PATENT DOCUMENTS

| | | |
|---|---|---|
| DE | 19846090 A1 | 4/2000 |
| DE | 10250504 C1 | 10/2003 |
| DE | 102004007370 A1 | 12/2004 |
| DE | 102005019907 A1 | 11/2006 |
| DE | 102005058590 B3 | 5/2007 |
| DE | 102005060481 A1 | 6/2007 |
| DE | 102007028113 A1 | 3/2008 |
| DE | 102007010961 A1 | 9/2008 |
| DE | 102013215446 A1 | 2/2014 |
| DE | 102013112699 A1 | 1/2015 |
| FR | 2821029 A1 | 8/2002 |
| JP | 2002142914 A | 5/2002 |

\* cited by examiner

DEVICE AND METHOD FOR FASTENING A BACKREST COVER TO A VEHICLE SEAT

This nonprovisional application is a continuation of International Application No. PCT/EP2017/064055, which was filed on Jun. 9, 2017, and which claims priority to German Patent Application No. 10 2016 210 242.7, which was filed in Germany on Jun. 9, 2016, and which are both herein incorporated by reference.

BACKGROUND OF THE INVENTION

Field of the Invention

The present invention relates to a device and a method for attaching a backrest cover to a vehicle seat.

Description of the Background Art

For example, according to DE 10 2013 112 699 A1, which corresponds to U.S. Pat. No. 9,440,568, it is prior art to attach a backrest cover to a vehicle seat by the means that fastening elements in the form of latching hooks that engage in mounting holes, which are provided in the backrest frame of the vehicle seat, are arranged on the side of the backrest cover facing the vehicle seat. This offers good possibilities to compensate for tolerances in the height of the backrest frame. These tolerances can be up to ±3 mm in the metal structure of the backrest frame. It is a disadvantage, however, that the latching hooks must be very large relative to the backrest frame for strength reasons. Yet large latching hooks require large mounting holes in the backrest frame. In turn, large mounting holes in the backrest frame compromise its strength. This could be countered by the use of additional material, a solution that itself is expensive and heavy. Moreover, oftentimes the metal structure of the backrest frame offers no possibility whatever for introducing large mounting holes, since it is designed in a manner to satisfy requirements for both strength and weight.

In addition, it is known according to DE 10 2007 010 961 A1, which corresponds to US 2008/0284220, to mechanically attach a rear backrest cover of a vehicle seat to the vehicle seat by means of a resilient element. The resilient element is designed as a U-shaped spring. Located at the open end of the resilient element is a hook. In order to attach the backrest cover to the vehicle seat, this hook is passed over a frame part of the vehicle seat so that the hook encloses the frame part. No good options are provided to compensate for tolerances in the height of the backrest frame.

An alternative possibility is the use of screw connections to attach a backrest cover to a vehicle seat. However, screw connections also require that certain tolerances be maintained, and are disadvantageous in mass production, since they are time-consuming to produce.

SUMMARY OF THE INVENTION

It is therefore an object of the present invention to provide an option for attaching a backrest cover to a vehicle seat in a secure, precise, and fault-tolerant manner.

This object is attained according to the invention in an exemplary embodiment in that, for fastening a backrest cover to a vehicle seat, the backrest cover has at least one latching element that engages on/in the vehicle seat to produce a connection between the backrest cover and vehicle seat, wherein the latching element is subjected to a spring force, the backrest cover has a guide element on the side facing the vehicle seat, and the latching element is movable along the guide element relative to the backrest cover. In other words, the at least one latching element or the at least one latching hook with which the backrest cover is attached to the vehicle seat in an assembly step is mounted in a floating manner on the backrest cover. In this design, the latching element is movable along a guideway defined by the guide element. Because the spring-loaded latching element is mounted in a floating manner, there is no need to provide any mounting holes/openings in the vehicle seat. The spring-loaded latching element simply engages on or in the vehicle seat, preferably on the inner perimeter of the backrest frame of the vehicle seat. Consequently, it is not necessary to maintain tight tolerances to prevent an inadequately tight fit of the backrest cover on the vehicle seat. On the contrary, tolerances that are present, for example an inner perimeter of the vehicle seat or of the backrest frame that is at the upper tolerance limit, are compensated for by the floating mounting of the latching element. Because the latching element is guided along a defined guideway, it is ensured that the latching element engages and permanently remains in a specific region of the vehicle seat or of the backrest frame. In other words, the backrest cover is securely attached in this way. Furthermore, the defined guideway makes it possible to accommodate the changing circumstances with different seats in a well-directed manner. It could be possible to incline or curve the guideway. In any case, the device according to the invention is consequently very flexible as well. It is possible to use large and stable latching hooks without difficulty.

Provision can be made that the guide element is simultaneously an end support for a spring element for an application of a spring force to the latching element. In this way, different functions are combined in one component, saving space and costs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
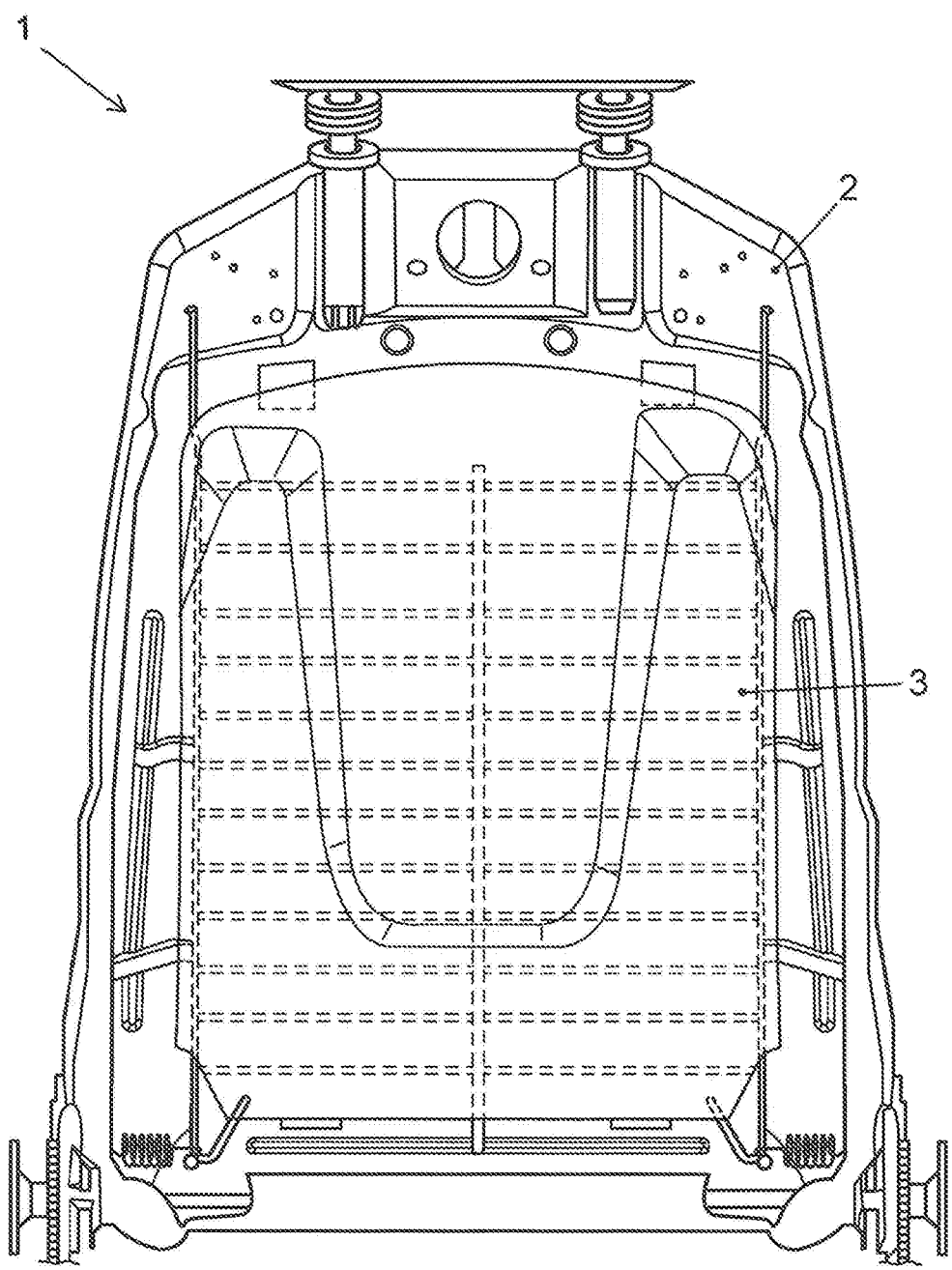
FIG. 1 illustrates a vehicle seat in a view from the rear.

FIG. 1 shows a vehicle seat 1 in a view from the rear with a backrest frame 2 and a backrest cover 3. The backrest cover 3 is located, in particular, on the rear side of the vehicle seat 1. The vehicle seat 1 has, as is commonly known, a seat surface and backrest surface, or upholstery, although this is not shown. Such a vehicle seat 1 can be used in any possible vehicle, whether an automobile, an airplane, or a boat.

Figure 2:
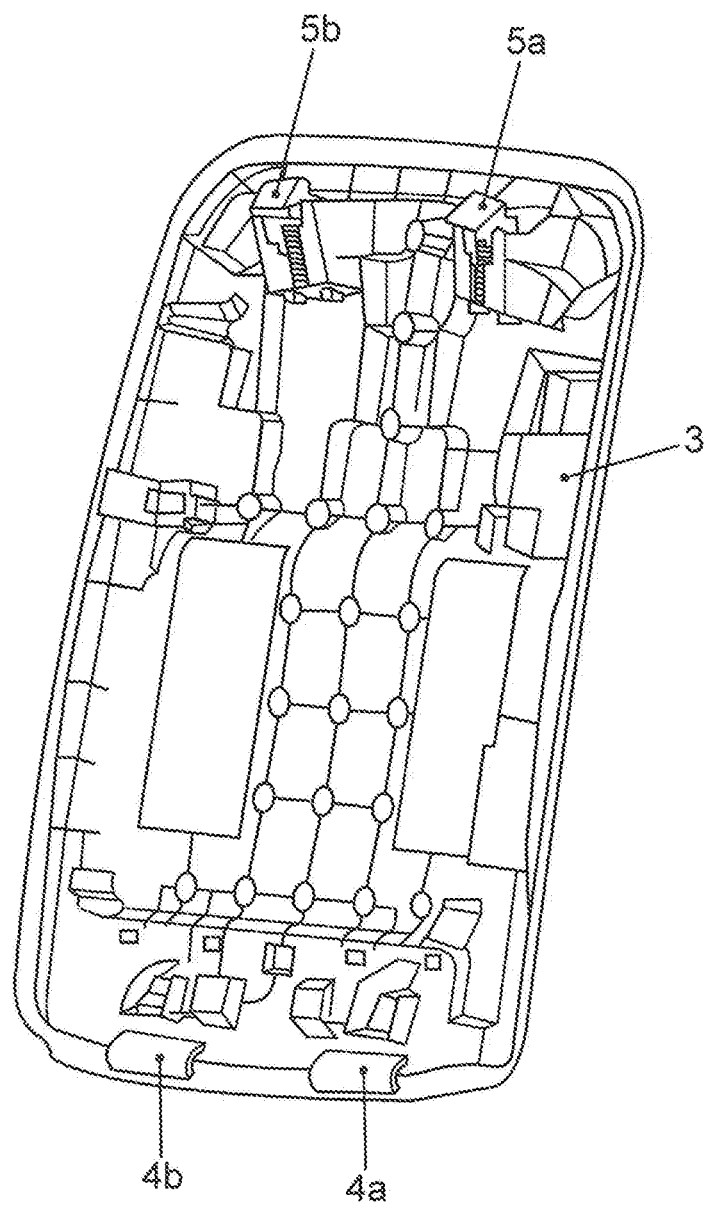
FIG. 2 illustrates a side of a backrest cover facing the vehicle seat.

FIG. 2 shows the side of the backrest cover 3 facing the vehicle seat 1 or the backrest frame 2. The backrest cover 3 is, in particular, dished in shape and rigid. The backrest cover 3 includes plug-in elements 4a and 4b, which engage in the vehicle seat 1 or in the backrest frame 2 in order to attach the backrest cover 3 to the vehicle seat 1. For this purpose, the plug-in elements 4a and 4b are designed to be hooked at their ends facing the vehicle seat 1. The number of plug-in elements 4a to 4n is arbitrary, it is also possible to provide only one plug-in element 4a. In any case, an interlocking connection between the vehicle seat 1 or the backrest frame 2 and the backrest cover 3 is made possible by means of the plug-in elements 4a and 4b. The plug-in elements 4a and 4b preferably are positioned in the lower region of the backrest cover 3. The backrest cover 3 additionally includes latching elements 5a and 5b, which engage/latch flush on the vehicle seat 1 or engage/latch in the vehicle seat 1 or engage/latch in the backrest frame 2 of the vehicle seat 1, for example a driver's seat, in particular in the inner perimeter of the at least partially ring-shaped backrest frame 2, in order to attach the backrest cover 3 to the vehicle seat 1. An interlocking connection between the vehicle seat 1 or the backrest frame 2 and the backrest cover 3 is likewise made possible by the latching elements 5a and 5b. The number of latching elements 5a to 5n is arbitrary. The backrest cover 3 can have just one latching element 5a, for example. The backrest cover 3 can also have four latching elements 5a to 5d.

Figure 3:
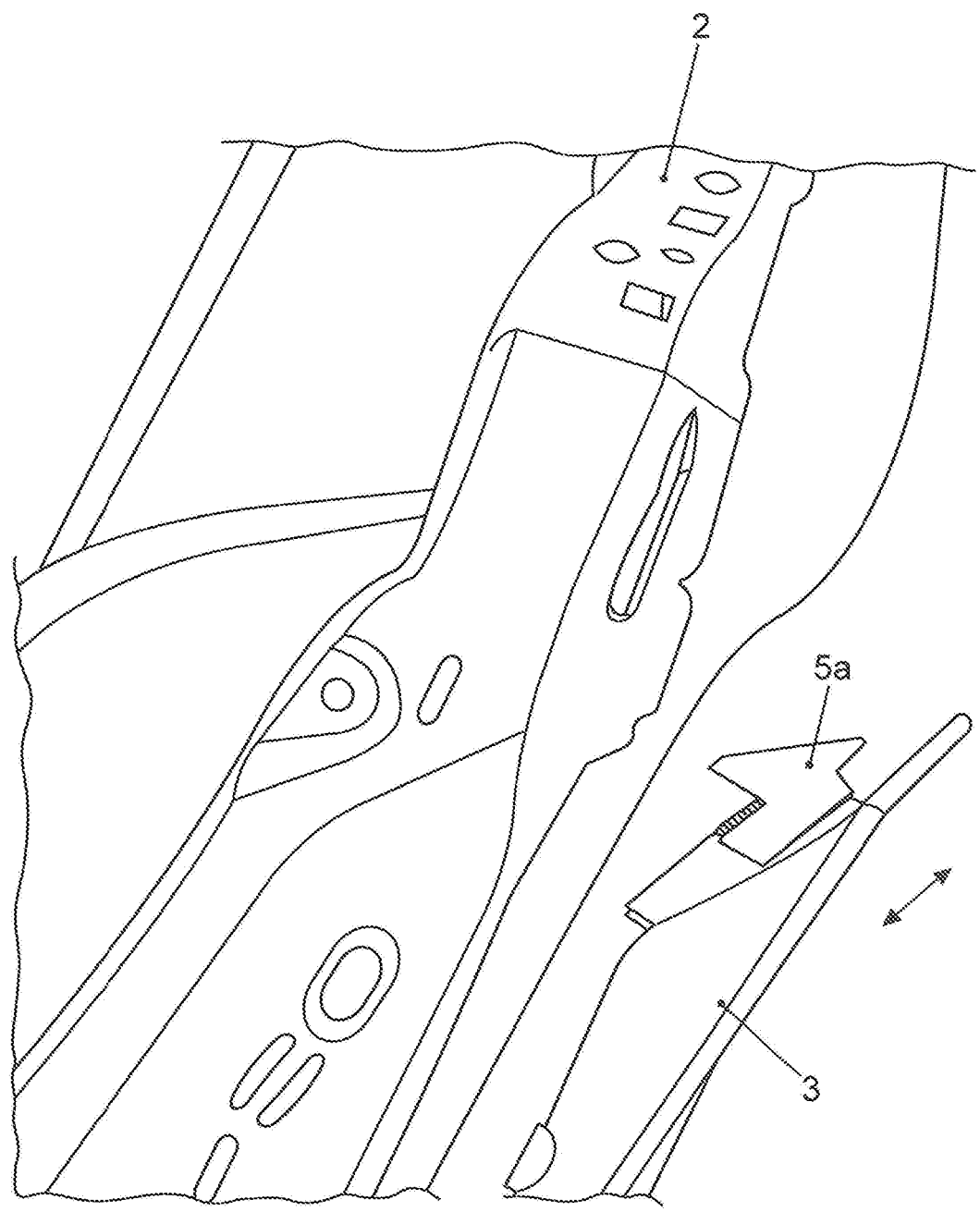
FIG. 3 illustrates the latching element in detail.

FIG. 3 shows a latching element 5a in greater detail and in its interaction with the backrest cover 3 and the backrest frame 2 or the vehicle seat 1. According to FIG. 3, the plug-in elements 4a to 4n engage in the vehicle seat 1 or the backrest frame 2, preferably in the inner perimeter of the backrest frame 2, and establish a first interlocking connection between backrest cover 3 and backrest frame 2 or vehicle seat 1. The latching element 5a is designed to be movable relative to the backrest cover 3, which is to say mounted in a floating manner, and is subjected to a spring force. In particular, the latching element 5a is designed to be movable relative to the backrest cover 3 such that the latching element 5a executes a motion along a straight line, as indicated in FIG. 3 by a double-headed arrow. The latching element 5a is guided along a guide element 6, and interacts with a spring 7, as described in connection with FIGS. 4 and 5.

Figure 4:
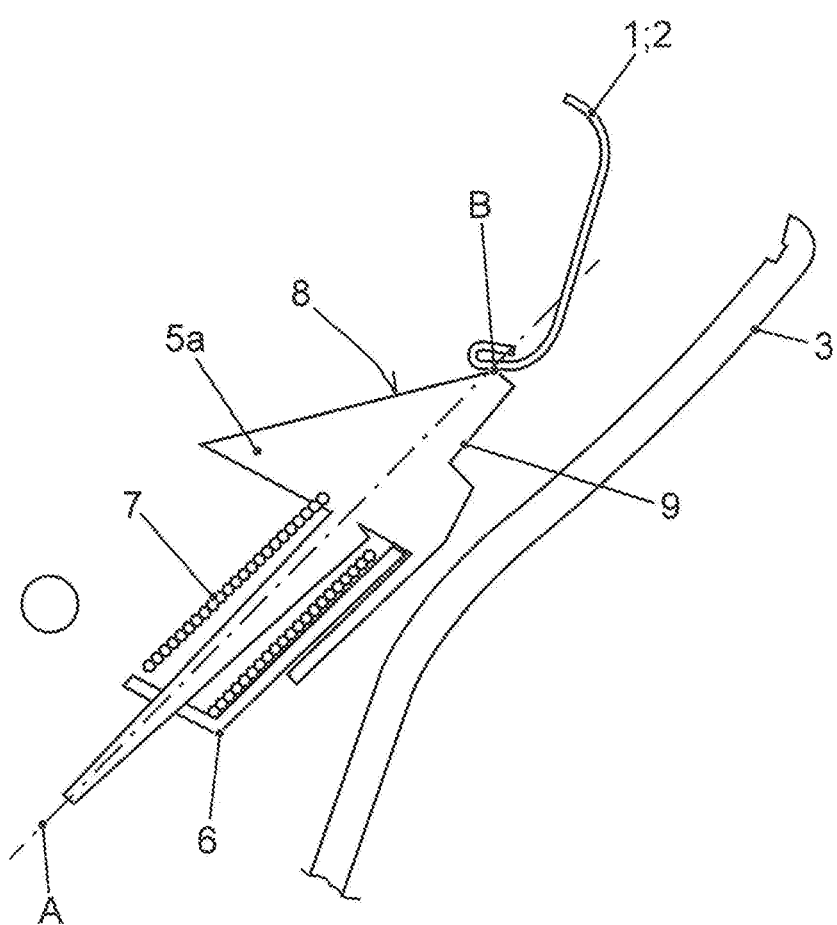
FIG. 4 illustrates the latching element in even greater detail.

FIG. 4 shows a latching element 5a in even greater detail, in particular in interaction with the backrest cover 3 and the backrest frame 2 or the vehicle seat 1. According to the invention, the backrest cover 3 has a guide element 6 on the side facing the vehicle seat 1. The guide element 6 includes, in particular, a plane or a surface or a path along which the latching element 5a is movable/is guided relative to the backrest cover 3, preferably is movable/is guided in a straight line. In particular, the latching element 5a slides along the guide element 6 as a result of the spring loading, or in other words is in contact with the guide element 6 and is conducted or moved in a guided way by the guide element 6. The guide element 6 is molded on the backrest cover 3 or is part of the backrest cover 3 or is itself the backrest cover 3. The guide element 6 preferably is simultaneously an end support for a spring element 7 for an application of a spring force to the latching element 5a. The spring element 7 preferably is a compression spring, for example with a cylindrical cross-section. The latching element 5a has a contact surface 8. The contact surface 8 is located on the latching element 5a in an end region that faces in the direction of the spring force acting on the latching element 5a. In addition, the contact surface 8 faces toward the vehicle seat 1 or the backrest frame 2. The contact surface 8 is furthermore inclined with respect to the longitudinal axis A of the latching element 5a. The latching element 5a additionally has a latching region 9 that is provided opposite the contact surface 8, likewise in an end region of the latching element 5a that faces in the direction of the force acting on the latching element 5a. The latching region 9 preferably is stepped. For this purpose, the latching element 5a is recessed in the direction of the contact surface 8.

Figure 5:
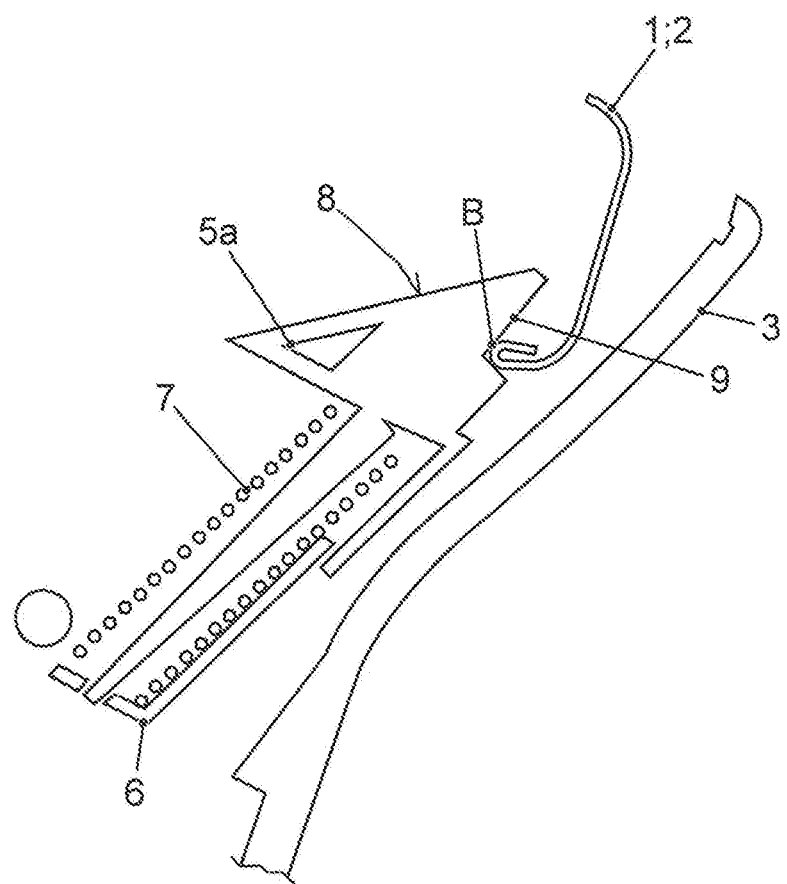
FIG. 5 illustrates the latched latching element.

In FIG. 4, the latching element 5a is shown in a compressed state. Moreover, the plug-in elements 4a to 4n engage in the vehicle seat 1 or the backrest frame 2, and establish a first interlocking connection between backrest cover 3 and backrest frame 2 or vehicle seat 1. The latching element 5a is compressed or subjected to a relatively large spring force because the backrest cover 3, and thus the latching element 5a, has been moved in the direction of the vehicle seat 1 so that the contact surface 8 and the vehicle seat 1 or the backrest frame 2 have first been brought into contact in the contact region B and, in the further course of the process, the latching element 5a is moved along the guide element 6 as a result of the inclination of the contact surface 8 such that the length of the spring is influenced (here, is shortened), because the backrest frame 2 is stationary. For final attachment of the backrest cover 3 to the backrest frame 2 or the vehicle seat 1, the latching element 5a rebounds again and goes to an end position, with a certain application of the spring force remaining in effect so that tolerances between backrest cover 3 and vehicle seat 1/backrest frame 2 are compensated for, and the latching element 5a remains in place securely and permanently. This rebounding takes place because the backrest frame 2 loses contact with the contact surface 8 in the contact region B, the backrest cover 3 including the latching element 5a is moved further in the direction of the vehicle seat 1, and the spring force releases the latching element 5a, which is now no longer hindered in its longitudinal extension by the contact with the backrest frame 2. In any event, the region B of the backrest frame 2 comes to a standstill, or in other words latches, in the stepped latching region 9. This is shown in FIG. 5. In this way, an additional interlocking connection is established between backrest cover 3 and backrest frame 2 or vehicle seat 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for attaching a backrest cover to a vehicle seat, the device comprising:
   at least one latching element that engages in the vehicle seat to produce a connection between the backrest cover and the vehicle seat, the latching element being subjectable to a spring force;
   a guide element formed on the backrest cover on a side facing the vehicle seat,
   wherein the at least one latching element is guided along the guide element relative to the backrest cover,
   wherein the at least one latching element has a contact surface that is located on the at least one latching element in an upper end region that faces in the direction of the spring force acting on the latching element, wherein the contact surface faces toward the vehicle seat and is inclined with respect to a longitudinal axis of the at least one latching element, wherein the at least one latching element additionally has a latching region in the upper end region of the at least one latching element, wherein the latching region opposes the contact surface so as to face away from the vehicle seat, and wherein the latching region is a stepped recess to accommodate a portion of the vehicle seat therein, the stepped recess being provided on an opposite side of the at least one latching element as the contact surface.

2. The device according to claim 1, wherein the guide element has a surface along which the at least one latching element is guided relative to the backrest cover.

3. The device according to claim 1, wherein the at least one latching element is guided in a straight line along the guide element relative to the backrest cover.

4. The device according to claim 1, wherein the guide element is molded on the backrest cover.

5. The device according to claim 1, further comprising a spring element that applies the spring force to the at least one latching element, wherein the guide element includes an end support for the spring element.

6. The device according to claim 5, wherein the spring element is a compression spring.

7. The device according to claim 5, wherein the end support of the guide element extends substantially transverse to a longitudinal axis of the at least one latching element, and wherein the end support has an opening through which a lower end region of the at least one latching element extends.

8. The device according to claim 1, further comprising plug-in elements provided on the backrest cover, wherein the plug-in elements engage in the vehicle seat in order to attach the backrest cover to the vehicle seat so that a first interlocking connection between the vehicle seat and the backrest cover is established by the plug-in elements, and wherein a second interlocking connection between the vehicle seat and the backrest cover is established by the at least one latching element, which likewise engages in the vehicle seat.

9. The device according to claim 8, wherein the at least one latching element engages in a backrest frame of the vehicle seat and/or the plug-in elements engage in the backrest frame of the vehicle seat.

10. The device according to claim 1, wherein the backrest cover includes the at least one latching element.

11. A method for attaching a backrest cover to a vehicle seat via a device according to claim 1, the method comprising:

moving the backrest cover and thereby the at least one latching element in a direction towards the vehicle seat so that the contact surface of the at least one latching element comes into contact with the portion of the vehicle seat, and consequently the at least one latching element is moved in a guided way along the guide element relative to the backrest cover; and engaging the stepped recess, provided on the opposite side of the at least one latching element as the contact surface, with the portion of the vehicle seat, due to the moving of the at least one latching element along the guide element, to produce a connection between the backrest cover and the vehicle seat.

12. A device for attaching a backrest cover to a vehicle seat, the device comprising:

at least one latching element that engages in the vehicle seat to produce a connection between the backrest cover and the vehicle seat, the latching element being subjectable to a spring force;

a guide element formed on the backrest cover on a side facing the vehicle seat; and a spring element that applies the spring force to the at least one latching element, wherein the at least one latching element is guided along the guide element relative to the backrest cover, wherein the guide element includes an end support for the spring element, wherein the spring element is a compression spring, and wherein the end support of the guide element extends substantially transverse to a longitudinal axis of the at least one latching element, and wherein the end support has an opening through which a lower end region of the at least one latching element extends.

* * * * *